United States Patent Office 3,449,311
Patented June 10, 1969

---

3,449,311
PROCESS FOR THE SUSPENSION POLYMERIZA-
TION OF VINYL AROMATIC MONOMERS
Arthur I. Lowell, Metuchen, N.J., assignor to Mobil Oil
Corporation, a corporation of New York
No Drawing. Filed Feb. 7, 1966, Ser. No. 525,308
Int. Cl. C08f *1/11*
U.S. Cl. 260—93.5                                         4 Claims

---

ABSTRACT OF THE DISCLOSURE

This invention is directed to the use of a novel extender in the suspension polymerization of vinyl monomers in which a difficultly soluble phosphate is utilized as the suspension stabilizer.

---

This invention relates to suspension polymerization. It is more particularly concerned with a novel extender in a suspension polymerization process for producing polymeric material in bead or particle form.

As is well known to those familiar with the art, bead-shaped polymeric materials are generally produced in suspension polymerization. In such polymerization, vinyl monomers are suspended or dispersed in an aqueous medium in the presence of a suspension stabilizer and a polymerization initiator. The suspension stabilizer acts to prevent undesirable agglomeration of the polymerizing monomer and produce high molecular weight polymer in bead form. Instable dispersions result in agglomeration of the polymeric material into large masses.

Well known suspension stabilizers that are widely used are the difficultly soluble phosphates, such as calcium, strontium, and magnesium phosphates. While under certain conditions these difficultly soluble phosphates serve to stabilize suspensions, they are erratic in behavior. Various materials have been proposed that function as an auxiliary or "extender" for the difficultly soluble phosphate to increase its effectiveness as a suspension stabilizer. The anionic surface active agents must be used in carefully controlled amounts to avoid adverse effects. In addition, the range of utilizable concentrations is very narrow, making it difficult to follow the commercial practice of varying the polymer bead size by varying the amount of anionic surface active agent. Another proposed type of extender is a soluble salt of alkyl phosphoric acid.

It has now been found that suspension polymerization systems employing difficultly soluble phosphate stabilibers can be extended with novel extenders that are highly effective, particularly in high temperature polymerizations.

Accordingly, it is an object of this invention to provide an improved suspension polymerization system. Another object is to provide means for stabilizing polymeric suspensions that is more effective than the means now available, particularly in high temperature polymerizations. A specific object is to provide novel, efficient extenders for suspension polymerization systems stabilized by difficultly soluble phosphates. Other objects and advantages of this application will become apparent to those skilled in the art, from the following detailed description.

In general this invention provides, in the aqueous suspension polymerization of at least one vinyl monomer in which a difficultly soluble phosphate is used as a suspension stabilizer, the improvement which comprises adding to the aqueous suspension, as an extender, a mixture of a water-soluble hydroperoxide and a water-soluble metal formaldehyde sulfoxylate or its equivalent.

Although styrene is the usual monomer employed in commercial applications, the process of this invention is applicable to various polymerizable ethylenic monomers including ortho-chlorostyrene; para-chlorostyrene; 2,6-dichlorostyrene; 2,4-dichlorostyrene; 2,5-dichlorostyrene; 2,3-dichlorostyrene; 3,4-dichlorostyrene; the higher polychlorostyrenes; para-methylstyrene; ortho-methylstyrene; meta-methylstyrene; ethyl vinyl benzenes; 4-vinyl pyridine; methylmethacrylate; vinyl naphthalene; the mixtures of these with each other or with styrene, or other copolymerizing material such as acrylonitrile; fumaronitrile; maleimide; butylacrylate; divinylbenzene; isopropenylbenzene; polychloro ring-substituted isopropenylbenzene; para, para$^1$-diisopropenyldiphenyl; para-vinyldiphenyl; methacrylonitrile; acrylic acid; butadiene; isoprene; 2,3-dimethylbutadiene; 2-chlorobutadiene-1,3; and vinylidene chloride.

Using the improved suspension system of this invention, it is possible to use weight ratios of monomer (or monomers) to water of between about 60:40 and about 30:70. Preferably, optimum efficiency appears to occur at a 50:50 weight ratio.

"Difficultly soluble" phosphates are those phosphates which are not classifiable as water-soluble phosphates. The term "difficultly soluble" includes in its scope the terms "soluble," "very slightly soluble" and "slightly soluble," given in Hackh's Chemical Dictionary, third edition, page 787; and is intended to mean that more than 100 parts by weight of water are required to dissolve one part by weight of phosphate. In all cases in the practice of this invention, there should be enough phosphate present to have undissolved phosphate particles in the suspension system. The base or metal component of these phosphates may be any metal whose carbonate is also difficultly soluble in water. Thus, the metal may be calcium, barium, strontium, magnesium, aluminum, zinc, cadmium or iron, all of which give difficultly soluble phosphates.

Phosphates of the type described above as suitable for the practice of the invention may be prepared by precipitation methods. For example, metathetic or double decomposition reactions may be used to obtain precipitates of difficultly soluble phosphates, such as the reaction of ortho-phosphoric acid with an appropriate oxide or base, for example, with calcium oxide, or the reaction of a water-soluble salt of ortho-phosphoric acid with an appropriate salt or base, for example, trisodium phosphate with calcium chloride. Phosphates having the desired proportions of three or more equivalents of metal or base for each phosphate group may be obtained by the use of stoichiometric proportions in the double decomposition reactions.

Depending upon the particular conditions employed in the preparation of phosphates for the practice of the invention, a variety of differently constituted products may be obtained. These include the normal ortho phosphates which contain two phosphate groups per molecule such as tricalcium phosphate, its hemi-hydrate $2Ca_3(PO_4)_2 \cdot H_2O$, which is believed by some to be the salt, $Ca_3H_2P_2O_9$, of the diatomic acid, $H_8P_2O_9$, which contains the equivalent of two phosphate groups per molecule, and other hydrates, as well as such preferred phosphates as the hydroxy apatites, such as hydroxy apatite (calcium hydroxy hexaphosphate) $3Ca_3(PO_4)_2 \cdot Ca(OH)_2$, which contains the equivalent of six phosphate groups per molecule, and like phosphates having an apatite lattice. However constituted, the phosphates used in the practice of the invention are derivatives of ortho-phosphoric acid even though, in a strict sense, they may not be orthophosphates, but may more properly be considered as salts of those phosphoric acids which have at least as much water of constitution as ortho-phosphoric acid, and in which salts at least three equivalents of base are associated in the compounds for each phosphate group.

Where colorless beads are desired, the use of achromatic or colorless phosphates is preferred. These phosphates are obtained with metals having colorless oxides such as aluminum, magnesium, calcium, barium, strontium, zinc and cadmium.

The amount of phosphate suspension stabilizer used can be varied widely, according with the activity of the stabilizer, the size of beads desired, and the amount of extender used. Generally, the amount will be between about 0.05% and about 5% or more of the weight of the total suspension, and preferably between about 0.1% and about 1%.

The "extender" used in this invention is a mixture of a water-soluble hydroperoxide and a water-soluble metal formaldehyde sulfoxylate or its equivalent. The preferred hydroperoxide component is t-butylhydroperoxide. However, other water-soluble hydroperoxides can be employed, such as cumene hydroperoxide, diisopropylbenzene hydroperoxide, p-methane hydroperoxide, and water-soluble aldehyde and ketone peroxides containing hydroperoxide groups. The amount of the water-soluble hydroperoxide used will, in general, be between about 3 p.p.m. and about 50 p.p.m. based upon the weight of the total suspension system.

The preferred water-soluble metal formaldehyde sulfoxylate is sodium formaldehyde sulfoxylate. Other water-soluble metal formaldehyde sulfoxylates can be used, however, such as potassium and zinc formaldehyde sulfoxylates. In lieu of the formaldehyde sulfoxylates, one can use water-soluble sulfites, water-soluble bisulfites, and water-soluble aromatic sulfinates. The amount of water-soluble metal formaldehyde sulfoxylate used will be between about 5 p.p.m. and about 120 p.p.m., based upon the weight of the total suspension system.

Preferably, the water-soluble hydroperoxide component is added to the well-stirred batch of monomer-water-mixture containing suspension stabilizer and other usual components of a suspension polymerization system as described hereinafter, after the batch has reached a temperature approaching the polymerization temperature, usually at about 190° F. It is possible, however, to add the hydroperoxide at temperatures as low as about 140° F.

The addition of the water-soluble metal formaldehyde sulfoxylate (or its equivalent) will ordinarily immediately follow the addition of the water-soluble hydroperoxide component, preferably at about 190° F. In the alternative, it can be added incrementally as the polymerization proceeds, but the former procedure is preferred.

It is preferable, for ease in handling, to add the extender components in the form of concentrated solutions, using the minimum amount of water needed to maintain these materials in solution.

The polymerization initiators should be soluble in styrene or whatever polymerizable monomer or comonomer is being used. Thus, non-limiting examples of catalysts are benzoyl peroxide, acetyl peroxide, ditertiary-butyl peroxide, lauryl peroxide, t-butyl perbenzoate, t-butyl peroxypivalate, t-butyl peroctoate, t-butyl peroxyisobutyrate, t-butyl peracetate, and combinations of these.

The amount of catalyst may be varied according to the nature and activity of the particular catalyst, according to the nature of the particular polymerizable material, and according to the product desired, as is well known in the art.

It is to be noted that the suspension polymerization system can contain, usually in the organic (i.e., monomer) phase various dissolved organic substances, including lubricants (for subsequent molding operational), anti-oxidants, dyes, and chain transfer agents. Such materials, of course, are incidental to the suspension polymerization system of this invention and, in general, have moderate or no influence on particle size.

Lubricants can be of varied types, including mineral lubricating oils, fatty esters, such as butyl stearate, and long chain fatty acids, such as stearic and oleic acids. The anti-oxidants, well-known in the art, can include butylated hydroxy toluene, i.e., 2,6-di-t-butyl-p-cresol.

As generally conducted, the polymerization of styrene and similar monomers and comonomers is carried out at temperatures of about 194° F. (90° C.). The suspension system of this invention, however, is stable at temperatures of as high as 221° F. It is essential that polymerization (or copolymerization) be sufficiently advanced (about 90%) before the temperature is raised above 221° F. The advantages of higher polymerization temperature are an accelerated polymerization rate, complete conversion of monomer, and elimination of residual peroxide.

The process of this invention is demonstrated in the following examples, using the components shown in the Table. For each example set forth in the Table, the first figure is the weight in grams of each component, the second figure shows the order of addition, and the third figure shows the temperature (° F.) of addition. In Example 1, after 10 hours at 230° F. and in Example 2, after 9 hours at 221° F. the polymerization was substantially complete and bead size was set. At this time, a small amount of surfactant was added to assist in retaining suspension stability at high temperatures, i.e., about 265° F. It was found, however, that the surfactant was not necessary (Example 3). In all cases, the phosphate stabilizer was formed in situ. The polymer beads obtained in each run were subjected to sieve analysis on the U.S. Sieve Series. The percent material retained on each screen is set forth in the Table for each run. In all runs the polymer product was transparent, spherical, and within a narrow, desirable size range.

Example 1

This run was carried out in a 30-gallon closed reactor. The two extenders, t-butyl hydroperoxide and sodium formaldehyde sulfoxylate, were added in a 1:1 weight ratio after the reaction mixture had reached 190° F. The polymerization was carried out at 194° F. for 4 hours, 221° F. for 4 hours, 230° F. for 3 hours, and 265° F. for 1 hour.

Example 2

In this run, carried out in a 30-gallon closed reactor, the weight ratio of the extenders (added at 190° F.) was 2:1. The polymerization was carried out at 221° F. for 9 hours, 230° F. for 1 hour, and 265° F. for 1 hour.

Example 3

In this run, carried out in a 10-gallon closed reactor, the extender weight ratio was 2:1. The polymerization was carried out at the temperatures and times set forth in Example 2.

Example 4

This run was carried out in a 2-liter reactor, using 50 p.p.m. t-butyl hydroperoxide and 125 p.p.m. sodium formaldehyde sulfoxylate. The polymerization was carried out at 194° F. for 7 hours.

TABLE

| Example | 1 | 2 | 3 | 4 |
|---|---|---|---|---|
| Water (distilled) | 48,500/1/ambient | 48,500/1/amb | 14,550/1/amb | 485/1/140. |
| $Na_3PO_4$—$12H_2O$ | 339/2/140 | 170/2/140 | 101.7/2/140 | 3.4/2/140. |
| $Na_2HPO_4$—$7H_2O$ | 86/3/140 | 86/3/140 | 25.7/3/140 | 0.86/3/140. |
| Styrene | 48,500/4/140 | 48,500/4/140 | 14,550/4/140 | 485 |
| White Oil | 1,335/5/125 | 1,334/5/125 | 400/5/125 | 11.05 |
| Butyl Stearate | 242.5/6/125 | 242.5/6/125 | 72/6/125 | 2.43 |
| Stearic Acid | 48.5/7/125 | 4.85/7/125 | 1.5/7/125 | 0.48 } 5 } 194. |
| Butylated hydroxy toluene | 0.97/8/125 | 0.97/8/125 | 0.3/8/125 | 0.01 |
| Benzoyl peroxide | 24.25/9/125 | | | 1.25 |
| t-Butyl perbenzoate | 24.25/10/125 | 53.35/9/125 | 16/9/125 | 0.1 |
| $CaCl_22H_2O$ (as aq. soln.) | 369/11/140 | 252/10/140 | 136.5/10/140 | 3.5/4/140. |
| t-Butyl hydroperoxide (″) | 1.2/12/190 | 4.85/11/190 | 1.46/11/190 | 50 p.p.m./6/194. |
| Sodium formaldehyde sulfoxylate (″) | 1.2/13/190 | 2.43/12/190 | 0.73/12/190 | 125 p.p.m./7/194. |
| Nacconol 90F. (3.8% aq. soln.) | 200/14/2 hrs. at 230° | 200/14/9 hrs. at 221° | | |
| R.p.m | 180 | 180 | 219 | 325. |
| Heat up time: | | | | |
| 125° F.–190° F. (hr.) | 0.5 | 0.5 | 0.5 | |
| 60° C.–90° C. (hr.) | | | | 1.0. |
| Sieve Analysis (percent retained): | | | | |
| 14 | 0 | 0.2 | 4.8 | 0. |
| 20 | 0.1 | 1.4 | 2.2 | 0.6. |
| 30 | 0.1 | 1.3 | 1.8 | 0.4. |
| 40 | 0.4 | 3.4 | 9.3 | 1.1. |
| 50 | 1.3 | 47.5 | 31.9 | 10.2. |
| 60 | 2.6 | 13.6 | 11.4 | 72.4. |
| 80 | 86.4 | 23.6 | 17.9 | 11.6. |
| 100 | 5.5 | 4.0 | 6.6 | 2.0. |
| pan | 3.6 | 5.0 | 14.1 | 1.8. |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. In the aqueous suspension polymerization of at least one vinyl aromatic monomer, at between about 194° F. and 265° F. using a polymerization initiator soluble in monomer, in which a difficultly soluble phosphate is used as a suspension stabilizer in an amount of between about 0.05 percent and about 5 percent by weight of the total suspension, the improvement which comprises adding to the aqueous suspension, as an extender, a mixture of about 3–50 p.p.m. of a water-soluble hydroperoxide and about 5–120 p.p.m. of a water-soluble metal formaldehyde sulfoxylate when a temperature of about 140–190° F. has been reached.

2. The process of claim 1, wherein said extender is a mixture of t-butylhydroperoxide and sodium formaldehyde sulfoxylate.

3. The process of claim 1, wherein said monomer is styrene.

4. The process of claim 2, wherein said vinyl monomer is styrene.

References Cited

UNITED STATES PATENTS 2,497,828   2/1950   Young.
2,715,118   8/1955   Grim.
3,049,522   8/1962   Lowell et al.

JAMES A. SEIDLECK, *Primary Examiner.*

U.S. Cl. X.R.

260—84.1, 85.5, 86.7, 88.2, 88.3, 89.5, 91.5